Dec. 2, 1969  J. S. ANDEREGG, JR., ET AL  3,482,106
PRECISION SHAFT ENCODER HAVING MEANS TO ELIMINATE THE EFFECT
OF TRANSLATIONAL MOVEMENT
Filed July 6, 1967  3 Sheets-Sheet 1

INVENTORS
JOHN S. ANDEREGG, JR
CHESTER A. FULLER
BY
ATTORNEY

Dec. 2, 1969   J. S. ANDEREGG, JR., ET AL   3,482,106
PRECISION SHAFT ENCODER HAVING MEANS TO ELIMINATE THE EFFECT
OF TRANSLATIONAL MOVEMENT
Filed July 6, 1967                                3 Sheets-Sheet 2

INVENTORS
JOHN S. ANDEREGG, JR.
CHESTER A. FULLER
BY
ATTORNEY

United States Patent Office 3,482,106
Patented Dec. 2, 1969

3,482,106
PRECISION SHAFT ENCODER HAVING MEANS TO ELIMINATE THE EFFECT OF TRANSLATIONAL MOVEMENT
John S. Anderegg, Jr., Bedford, and Chester A. Fuller, Chelmsford, Mass., assignors to Dynamics Research Corporation, Stoneham, Mass., a corporation of Massachusetts
Filed July 6, 1967, Ser. No. 651,425
Int. Cl. G01d 5/34
U.S. Cl. 250—231           3 Claims

ABSTRACT OF THE DISCLOSURE

A shaft encoder having electro-optical readout stations positioned diametrically to measure light transmitted through a pair of discs having gratings thereon. Each station produces a pair of out-of-phase signals. The signals from both stations are logically combined to produce an output signal in which error contribution from mis-centering of the discs is considerably decreased.

FIELD OF THE INVENTION

This invention relates generally to electromechanical transducers and more particularly to improved precision encoders incorporating an electro-optical system to provide highly accurate output indications of the amount of rotation of a shaft.

PRIOR ART

Encoders providing an output indication of the amount of rotation of a shaft are well known and may be found incorporated in a wide variety of applications, particularly in general positional devices such as inertial navigation equipment and the like. One type of encoder, now in use, employs a pair of disks each having a series of alternately light transmissive and opaque sectors radially disposed about its center and extending to its periphery. One disk is mounted on the shaft whose rotation is to be determined, while the other disk is mounted concentrically with the shaft but mechanically fixed to a reference point. Rotation of the shaft then occasions modulation of a light beam passed through both disks to photosensitive sensors. The output of the sensors are indicative of the amount and direction of shaft rotation.

The above-described devices have been highly successful as general purpose angular motion detectors, but several factors may affect the accuracy of these devices. One troublesome factor is excessive radial runout which may be caused by excessive bearing wear or by misalignment between the rotating disk and the shaft.

The precision of the output signals from an encoder is dependent upon inter-disk spacing and radial stability. Relatively small translational motion of the shaft can impair the usefulness of an encoder, particularly one with a high line frequency. Such translation may be caused by shaft runout as well as lack of concentricity between the rotating shaft and the disk attached thereto. Mechanical tolerances require for an encoder of this type thus become impractical when a high precision output is required. Even if the device were manufactured with these tolerances the result could be a device subject to misalignment and potential error.

SUMMARY OF THE INVENTION

The present invention, therefore, contemplates and has as a primary object the provision of a shaft angle encoder capable of maintaining high angular resolution without requiring extremely high mechanical tolerances.

Broadly speaking, the encoder of the present invention utilizes a stationary and a rotatable disk generally similar in form and structure to one of the two disks of the previously mentioned prior art encoder together with a unique signal generalizing system which differs from the previously known encoders, particularly in the arrangements of the light sensing units which are mounted in groups at opposite ends of a diameter of the disk and in the assocated electronic circuitry which provides means of combining signals of random arrival time from the two groups of light sensing units. More particularly, this is accomplished by feeding electronic signals from the sensors simultaneously to four multiplier circuits, and the resultant logical operations provide output signals in which the effects of translation and motion are significantly decreased.

DESCRIPTION OF PREFERRED EMBODIMENTS

Figure 1:
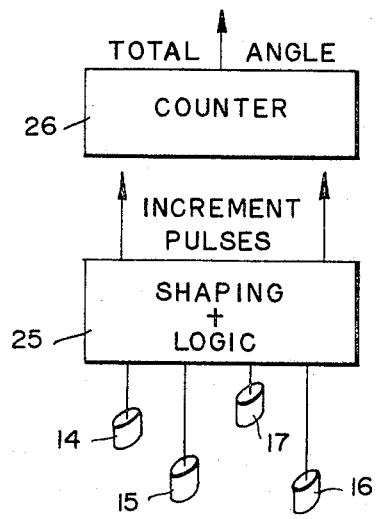
FIG. 1 is a simplified schematic of a prior art optical encoder.
Figure 1:
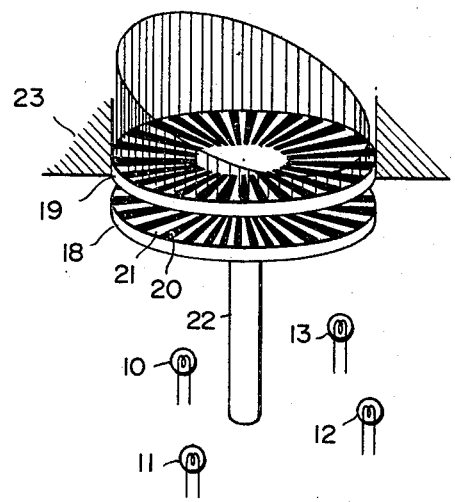

In FIG. 1 there is shown a prior art optical encoder in which four light sources, 10, 11, 12 and 13 are positioned opposite four photosensors, 14, 15, 16 and 17, each spaced 90° apart. Interposed between the sources and the sensors are two transparent disks 18 and 19 each having rule patterns of opaque sections 20 alternated with clear sectors 21. One disk 18 is mounted on a rotating shaft 22 while the other disk 19 is permanently affixed to a housing 23. When the disk 18 is rotated then the light which passes through both disks 18 and 19 forms a moire pattern in which typically maximum light is transmitted through one region while 180° away the light transmission is at a minimum. Thus, in FIG. 1 photocell 14 will receive minimum illumination while photocell 16 is receiving maximum illumination and at the same time photocells 15 and 17 will each receive one-half the amount of illumination received by photocell 16. A full revolution of the input shaft 22 causes the moire pattern to rotate a number of times equal to the number of sectors 20.

The signals emitted from the photosensors 14, 15, 16, and 17 can be fed to shaping and logic circuits 25 and, depending upon the output circuit used, one or more pulses can be generated for each full revolution of the moire pattern. A simple counter 26 may be used to accumulate pulses from network 25 to generate a code indicating the total angular movement. Since the fixed disk 19 affects the signal only in the areas of the lamps and sensors, then in some encoder designs this disk is not an entire disk but rather segments of a disk are employed in the positions between the lamps and sensors.

Figure 2:
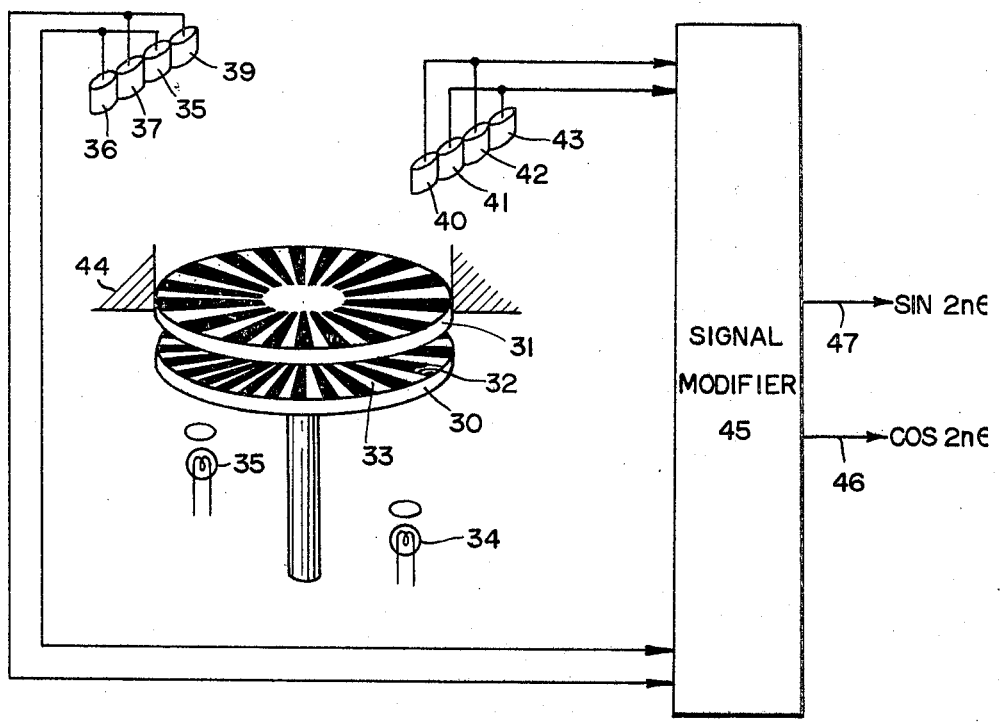
FIG. 2 is a simplified schematic of the optical encoder of the present invention.

With reference now to FIG. 2, there is shown one embodiment of the present invention. A pair of transparent disks 30 and 31 are formed with light opaque sections 32 alternated with light transparent sections 33. One disk, for example, disk 30, is free to rotate while the other, disk 31, is fixed to the case 44. The disks 30 and 31 are mounted concentrically and lamps 34 and 35 mounted adjacent to one surface of disk 33 while light sensing cells 36 through 39 and 40 through 43 are mounted adjacent to the outer surface of disk 31. The light sensing cells are arranged in two diametrically opposed groups, groups 36 through 39 and 40 through 43. Lamp assembly 34 is positioned opposite to the sensing cell group 36 through 39 while lamp assembly 35 is positioned opposite to the sensing cell group 40 through 43. The cells are electrically interconnected in a manner which will be described below and their output signals are fed to a signal modifier 45 which, in turn, produces output signals on terminals 46 and 47.

The cells 36 through 43 are electrically interconnected in pairs to provide four push-pull signals that are phase displaced 90° with respect to one another. For pure rotational motion of disk 30, one pair of sensors in a group produces an output signal of the form $\sin n\theta$ while the output from the other pair has the form $\cos n\theta$ where $n$ is the number of nontransparent sectors on the rotary disk and $\theta$ is the amount of rotation of the disk. However, when their is radial runout or other eccentricity, a translational motion occurs in addition to rotational motion and the sensor output signals become $\sin n(\theta\pm\phi)$ and $\cos n(\theta\pm\phi)$ where $\phi$ is an angle equivalent to the translational motion of the disk. Thus, in such signals, the factor $\phi$ is an error in that it is not a quantity indicative of the amount of rotation. The signal modifier 45 is adapted, in conjunction with the arrangement of the sensors, to eliminate this error $\phi$ so that the output signals appearing at terminals 46 and 47 have the ideal form $\cos 2n\theta$ and $\sin 2n\theta$.

Figure 3:
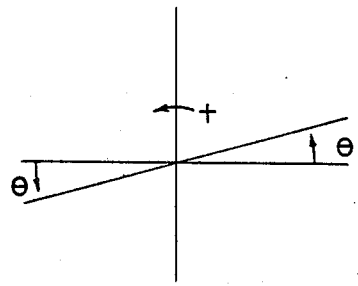
FIG. 3 is a diagrammatic representation of the detectable angle of rotation.
Figure 4:
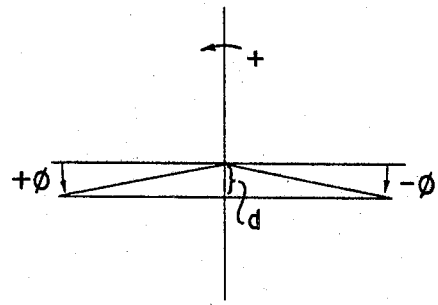
FIG. 4 is a diagrammatic representation of the effects of translation.

The manner in which translational motion produces the angular error can perhaps be better understood by reference to FIGS. 3 and 4. In both figures, counterclockwise rotation of the disk is assumed to be positive. In FIG. 3, $\theta$ is shown as the angle of rotation of rotary disk 30, while in FIG. 4, $d$ is the distance that the center of disk 30 has moved on a horizontal axis and this movement or translation is, in effect, the equivalent of rotation of the opposite ends of the diameter by small angles, $+\phi$ and $-\phi$.

Sensors positioned therefore at the left end of the diameter measure, under the conditions illustrated in FIG. 4, an angular movement of $(\theta+\phi)$. Under these same conditions sensors positioned at the right hand end of the diameter measure an angular movement of $(\theta-\phi)$. When the sensors are positioned and appropriately interconnected then the outputs from one group of sensors are $\sin n(\theta+\phi)$ and $\cos n(\theta+\phi)$ while the outputs from the other group of sensors are $\sin n(\theta-\phi)$ and $\cos n(\theta-\phi)$. Thus, each of the outputs will vary with any translational motion and these outputs are therefore sensitive to radial runout.

Cross multiplications of these output waveforms, however, yields a quantity that is independent of $\phi$ and therefore insensitive to radial runout in a direction normal to the diameter on which the groups of photocells lie. For an arbitrary direction of runout, the sensitivity is diminished.

Thus, $$\cos n(\theta+\phi) \cos n(\theta-\phi) - \sin n(\theta+\phi) \sin n(\theta-\phi)$$
$$= \cos n(\theta+\phi+\theta-\phi)$$
$$= \cos 2n\theta$$

similarly, $$\cos n(\theta+\phi) \sin n(\theta-\phi) + \sin n(\theta+\phi) \cos n(\theta-\phi)$$
$$= \sin 2n\theta$$

Figure 5:
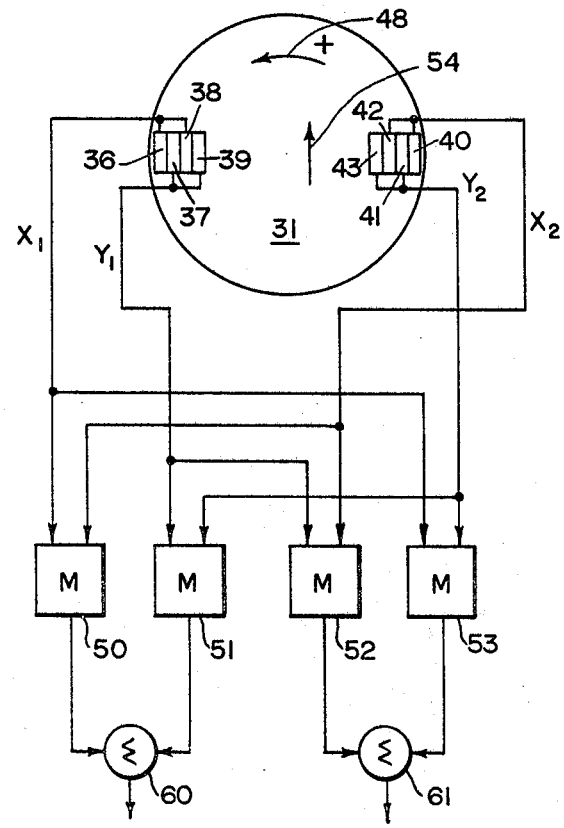
FIG. 5 is a block diagram of the device of the present invention.

The manner in which these mathematical operations are electrically implemented is illustrated in FIG. 5 in which the analog circuitry used in conjunction with the device shown in FIG. 2 is shown diagrammatically. The sensors are illustrated in FIG. 5 as positioned above stationary disk 31. The rotary disk 30 being below disk 31 cannot be seen in this figure but is assumed to be rotating in a counterclockwise direction as indicated by arrow 48. The two groups of photocells 36 through 39 and 40 through 43 are shown positioned on a diameter of disk 31. The photocells 36 and 38 are electrically paired and interconnected as are photocells 37 and 39, photocells 40 and 42, and photocells 41 and 43. Radiation from lamps 34 and 35, not shown in this figure, passes upward through both disks and impinges upon the sensors. Rotation of the disk 30 relative to disk 31 produces a moire fringe pattern and the motion of this pattern causes a modulation of the output of the cells 36 to 43.

If the stationary disk or reticle is skewed with respect to the pattern of the rotary disk, four signals at phase relationship of 0°, 90°, 180° and 270° may be obtained. The sets of signals derived from the group of sensors 36 and 39 are designated X1 and Y1, respectively, and those derived from sensors 40 and 43 are designated X2 and Y2. These output signals X1, Y1, X2, and Y2 are fed to a plurality of identical multipliers 50, 51, 52 and 53. The signal X1 is fed simultaneously to multipliers 50 and 53 and the signal Y1 is simultaneously fed to multipliers 51 and 52. The signal X2 is simultaneously fed to multipliers 52 and 50 and the signal Y2 is simultaneously fed to multipliers 53 and 51. In this instance, if the rotary disk is perfectly centered, then $X1=\sin n(\theta+\phi)$ and $X2=\cos n(\theta-\phi)$, $Y2=\sin n(\theta-\phi)$.

In accordance with the mathematics shown above, the following signal synthesis preserves both the amplitudes and the zero crossings of the resultant signals:

$$Z1 = X1X2 - Y1Y2$$
$$= \cos n(\theta+\phi) \cos n(\theta-\phi) - \sin n(\theta+\phi) \sin n(\theta-\phi)$$
$$= \cos n(\theta+\phi+\theta-\phi)$$
$$= \cos 2n\theta$$

Similarly, $$Z2 = X1Y2 + Y1X2$$
$$= \sin 2n\theta$$

To achieve these signals the output of multiplier 51 is made negative and added algebraically to the output from multiplier 50 in summing circuit 60 and the resulting output is signal Z1. Similarly, the outputs from multipliers 52 and 53 are added in summing circuit 61, the output of which becomes signal Z2.

Formulation of the signals Z1 and Z2 in this way preserves both the amplitude and zero crossing stability of each signal and also effectively doubles the number of periods on the rotary disk. Therefore, the present device achieves both a high angular resolution and a sense of direction of rotation.

Figure 6:
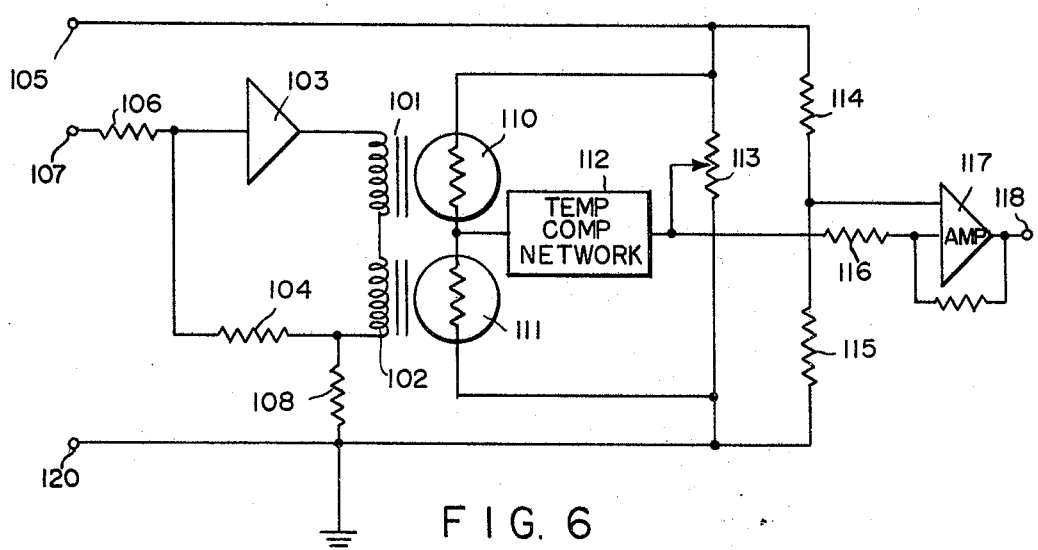
FIG. 6 is a schematic diagram of the multiplier circuit shown in FIG. 5.

Since the circuit of the multipliers 50 to 53 is important to the accuracy of the signal output, a schematic of a suitable multiplier circuit is described in conjunction with FIG. 6. Such multiplier networks are presently commercially available.

Such a multiplier circuit may consist of a pair of series connected magnetic cores 101 and 102, arranged in a series loop with an amplifier 103 and a resistor 104. The loop is coupled to one input terminal 107 through a resistor 106. The second input terminal 120 is connected to ground and the entire loop is connected to ground through a resistor 108.

Matched Hall effect resistors 110 and 111 are connected in series between a third input terminal 105 and ground. These Hall effect resistors 110 and 11 are positioned such that they are affected by the magnetic fields from cores 101 and 102. The output of these resistors is fed through a temperature compensation network of resistors 113, 114, 115 and 116, and an amplifier 117 to an output 118.

The operation of this circuit may be better understood from the following example: If we assume for the moment that the circuit under consideration is that of multiplier 50, then the signals X1 and X2 are being simultaneously supplied to it from sensors 36 through 39 and sensors 40 through 43 arranged on opposite ends of the diameter of the device. One of these signals is connected to the multiplier circuit 50 by means of the input terminals 105 and 120 and the other is connected between terminals 107 and 120. The signals are then acted upon by the magnetic cores 101 and 102 in a push-pull manner such that the output signals provided by the Hall effect resistors 110 and 111 has the form $2 \cos \phi \cos n\theta$. This signal is then passed through the temperature compensating network 112, the balanced rectifier bridge arrangement and the amplifier 117 to the output terminal 118 which is connected to summing elements 60 of FIG. 5. In the summing element this output signal is added to the output signals from multiplier 51 to result in a final signal equal to $Z = \cos 2 N\theta$.

Having described the present invention, various modification, adaptations and departures will now become apparent to those skilled in the art and, therefore, it is respectfully requested that the invention herein should be construed and limited only by the spirit and scope of the appended claims.

What is claimed is:

1. An electro-optical transducer comprising:
   first and second discs arranged substantially parallel to one another and adapted for relative rotation about a common axis, each of said discs having a plurality of equiangular light transmissive and opaque sectors;
   means for transmitting light through diametrically opposite portions of said discs;
   photodetector means for receiving light transmitted through said discs, said photodetector means including,
   a first and a second plurality of photosensors each disposed at respective diametrically opposite portions of said discs in light receiving relationship with said light transmitting means; means for interconnecting said photosensors of each plurality to provide a pair of quadrature phased signals representative of the extent of relative rotational movement between said discs and the extent of spurious translational movement therebetween; means for multiplying together the quadrature phased signals of each of said pairs;
   means for multiplying each of said quadrature phased signals of a pair with each of said quadrature phased signals of said other pair; and
   summing means for combining the cross multiplied signals from said multiplying means to provide a pair of quadrature phased output signals representative of the extent of relative rotational movement between said discs and without distortion caused by said spurious movement.

2. An electro-optical transducer according to claim 1, wherein
   said multiplying means includes
   a first and a second multipler for multiplying said pair of quadrature phased signals of said respective first and second plurality of photosensors;
   a third multipler for multiplying one of the pair of quadrature phased signals of said first plurality of photosensors with one of the pair of quadrature phased signals of said second plurality of photosensors;
   a fourth multipler for multipling the other of the pair of quadrature phased signals of said first plurality of photosensors with the other of the pair of quadrature phased signals of said second plurality of photosensors;
   and said summing means includes
   a first summing circuit operative in response to the output signals from said first and second multipliers to provide a first output signal; and
   a second summing circuit operative in response to the output signals from said third and fourth multipliers to provide a second output signal.

3. An electro-optical transducer according to claim 2 wherein
   said first plurality of photosensors is operative to provide a pair of signals of the form $\sin n(\theta+\phi)$ and $\cos n(\theta+\phi)$, respectively, where $n$ is the number of pairs of transmissive and opaque sectors on said discs, $\theta$ is the angle of relative rotation of said discs, and $\phi$ is the angular equivalent of the translational motion of said discs;
   said second plurality of photosensors is operative to provide a pair of signals of the form $\sin n(\theta-\phi)$ and $\cos n(\theta-\phi)$, respectively;
   said first and second summing circuits providing first and second output signals of the form $\cos 2n\theta$ and $\sin 2n\theta$, respectively.

References Cited

UNITED STATES PATENTS

| | | | |
|---|---|---|---|
| 2,886,718 | 5/1959 | Shepherd et al. | 88—14 |
| 3,218,911 | 11/1965 | Bower et al. | 88—14 |
| 3,227,888 | 1/1966 | Shepherd et al. | 250—237 |
| 3,330,964 | 7/1967 | Hobrough et al. | 250—231 X |
| 3,364,359 | 1/1968 | Cronin | 250—231 |

ROBERT SEGAL, Primary Examiner

U.S. Cl. X.R.
116—115; 250—210